United States Patent
Kim et al.

(12)

(10) Patent No.: US 6,706,227 B1
(45) Date of Patent: Mar. 16, 2004

(54) METHOD FOR MANUFACTURING CONTAINER BY USING STARCH AND GRAIN POWDER

(76) Inventors: Young Bok Kim, 102-101, Mia Hyundai Apt., 190-2 (6-5), Mia-dong, Kangbuk-ku, Seoul (KR); Myung Ja Kim, 102-101, Mia Hyundai Apt., 190-2 (6-5), Mia-dong, Kangbuk-ku, Seoul (KR)

( * ) Notice: Subject to any disclaimer, the term of this patent is extended or adjusted under 35 U.S.C. 154(b) by 443 days.

(21) Appl. No.: 09/807,530
(22) PCT Filed: Aug. 11, 2000
(86) PCT No.: PCT/KR00/00893
§ 371 (c)(1), (2), (4) Date: May 21, 2001
(87) PCT Pub. No.: WO01/12703
PCT Pub. Date: Feb. 22, 2001

(65) Prior Publication Data
(65)

(30) Foreign Application Priority Data

Aug. 16, 1999 (KR) ......................................... 1999-33750

(51) Int. Cl.⁷ .................. B29B 11/02; B29B 11/14; B29B 13/10
(52) U.S. Cl. ................ 264/115; 264/118; 264/122; 264/123; 264/126
(58) Field of Search ................................. 264/109–128

(56) References Cited

U.S. PATENT DOCUMENTS 6,475,416 B2 * 11/2002 Kim et al. .................. 264/115
6,537,474 B1 * 3/2003 Kim et al. .................. 264/115

* cited by examiner

*Primary Examiner*—Stephen J. Lechert, Jr.
(74) *Attorney, Agent, or Firm*—IP Strategies, P.C.

(57) ABSTRACT

A method for manufacturing a combustion resistant and water resistant large container is disclosed. A starch or cereal powders are mixed with water at a certain ratio, and the mixture is heated to a certain temperature so as to form a glue. A drying is carried out, a powderizing is carried out, and then it is mixed with powders of a natural resin (rosin). Then this mixture is mixed with water, and then, it is fabricated by using a fabricator.

6 Claims, No Drawings

METHOD FOR MANUFACTURING CONTAINER BY USING STARCH AND GRAIN POWDER

This application claims benefit under 35 U.S.C. 371 of PCT/KR00/00893 filed Aug. 11, 2000.

BACKGROUND OF THE INVENTION

1. Field of the Invention

The present invention relates to a method for manufacturing a container for one time use, which is naturally decomposed. Particularly, the present invention relates to a method for manufacturing a combustion resistant and water resistant large container in which a starch or cereal powders are mixed with water at a certain ratio, the mixture is heated to a certain temperature so as to form a glue, a drying is carried out, a powderizing is carried out, then it is mixed with powders of a natural resin (rosin), then this mixture is mixed with water, and then, it is fabricated by using a fabricator.

2. Description of the Prior Art

Generally, the containers for one time use are classified into: containers made of plastic materials, containers made of papers, and containers made of agricultural byproducts. The containers made of plastic materials cannot be made to be naturally decomposed, and when burning them, toxic gases are produced, thereby polluting the environment. Some containers made of papers for containing water are coated with a plastic film, and therefore, the recycling of them is difficult. The containers made of agricultural byproducts are manufactured by recycling the agricultural byproducts, and are naturally decomposed, thereby excluding the environmental contamination. However, the fabricating process is complicated, and much handy works are required, this being a troublesome feature.

SUMMARY OF THE INVENTION

The present invention is intended to overcome the above described disadvantages of the conventional technique. Therefore it is an object of the present invention to provide a method for manufacturing a combustion resistant and water resistant container, in which 80 wt % of corn starch, potato starch, wheat flour, rice flour or barley flour is mixed with 20 wt % of water, an agitation is carried out, a heating carried out to a temperature of 100 degrees C. to form a glue, a drying is carried out, a powdering is carried out, then 70 wt % of this powder is mixed with 15 wt % of rosin and 15 wt % of water, and then a fabrication is carried out by using a fabricator with 5 Kg/square cm.

DETAILED DESCRIPTION OF THE PREFERRED EMBODIMENTS

The container of the present invention is composed of corn starch, potato starch, wheat flour, rice flour or barley flour, and rosin (which obtained by removing terebene oil from a resin).

EXAMPLE 1

Corn starch in an amount of 80 wt % was mixed with 20 wt % of water, and then an agitation was carried out for 30 minutes.

The revolution speed of the agitator was 60 rpm. After the completion of the agitation, a heating was carried out at a temperature of 100 degrees C. until a glue was formed, so as to improve the sticking property. The heated and aged glue was dried. The dried glue was powderized. The aged corn starch in an amount of 70 wt % was mixed with 15 wt % of rosin, and then an agitation was carried out. The above mixture was mixed with 15 wt % of water, and then an agitation was carried out for 30 minutes. The revolution speed of the agitator was 60 rpm. Upon completion of the agitation, a mixture which was felt like a moist saw dust was formed. The above mixture was put into a fabricator at a temperature of 250–350 degrees C., and then a pressure was applied at 5 Kg/square cm, thereby fabricating a container.

EXAMPLE 2

Potato starch in an amount of 80 wt % was mixed with 20 wt % of water, and then an agitation was carried out for 30 minutes. The revolution speed of the agitator was 60 rpm. After the completion of the agitation, a heating was carried out at a temperature of 100 degrees C. until a glue was formed, so as to improve the sticking property. The heated and aged glue was dried. The dried glue was powderized. The aged potato starch in an amount of 70 wt % was mixed with 15 wt % of rosin, and then an agitation was carried out.

The above mixture was mixed with 15 wt % of water, and then an agitation was carried out for 30 minutes. The revolution speed of the agitator was 60 rpm. Upon completion of the agitation, a mixture which was felt like a moist saw dust was formed.

The above mixture was put into a fabricator at a temperature of 250–350 degrees C., and then a pressure was applied at 5 Kg/square cm, thereby fabricating a container.

EXAMPLE 3

Wheat flour in an amount of 80 wt % was mixed with 20 wt % of water, and then an agitation was carried out for 30 minutes. The revolution speed of the agitator was 60 rpm. After the completion of the agitation, a heating was carried out at a temperature of 100 degrees C. until a glue was formed, so as to improve the sticking property. The heated and aged glue was dried. The dried glue was powderized. The aged wheat flour in an amount of 70 wt % was mixed with 15 wt % of rosin, and then an agitation was carried out. The above mixture was mixed with 15 wt % of water, and then an agitation was carried out for 30 minutes. The revolution speed of the agitator was 60 rpm. Upon completion of the agitation, a mixture which was felt like a moist saw dust was formed.

The above mixture was put into a fabricator at a temperature of 250–350 degrees C., and then a pressure was applied at 5 Kg/square cm, thereby fabricating a container.

EXAMPLE 4

Rice flour in an amount of 80 wt % was mixed with 20 wt % of water, and then an agitation was carried out for 30 minutes. The revolution speed of the agitator was 60 rpm. After the completion of the agitation, a heating was carried out at a temperature of 100 degrees C. until a glue was formed, so as to improve the sticking property. The heated and aged glue was dried. The dried glue was powderized. The aged rice flour in an amount of 70 wt % was mixed with 15 wt % of rosin, and then an agitation was carried out. The above mixture was mixed with 15 wt % of water, and then an agitation was carried out for 30 minutes. The revolution speed of the agitator was 60 rpm. Upon completion of the agitation, a mixture which was felt like a moist saw dust was formed. The above mixture was put into a fabricator at a temperature of 250–350 degrees C., and then a pressure was applied at 5 Kg/square cm, thereby fabricating a container.

EXAMPLE 5

Barley flour in an amount of 80 wt % was mixed with 20 wt % of water, and then an agitation was carried out for 30 minutes. The revolution speed of the agitator was 60 rpm. After the completion of the agitation, a heating was carried out at a temperature of 100 degrees C. until a glue was formed, so as to improve the sticking property. The heated and aged glue was dried. The dried glue was powderized. The aged barley flour in an amount of 70 wt % was mixed with 15 wt % of rosin, and then an agitation was carried out. The above mixture was mixed with 15 wt % of water, and then an agitation was carried out for 30 minutes. The revolution speed of the agitator was 60 rpm. Upon completion of the agitation, a mixture which was felt like a moist saw dust was formed.

The above mixture was put into a fabricator at a temperature of 250–350 degrees C. and then a pressure was applied at 5 Kg/square cm, thereby fabricating a container.

EXAMPLE 6

A natural starch in an amount of 70 wt % was mixed with 15 wt % of rosin, and then an agitation was carried out for 30 minutes. The revolution speed of the agitator was 60 rpm. The above mixture was mixed with 15 wt % of water, and then an agitation was carried out for 30 minutes. The revolution speed of the agitator was 60 rpm. Upon completion of the agitation, a mixture which was felt like a moist saw dust was formed.

The above mixture was put into a fabricator at a temperature of 250–350 degrees C., and then a pressure was applied at 5 Kg/square cm, thereby fabricating a container.

According to the present invention as described above, a starch or cereal powders are used as the raw material, and since the starch or the cereal powders are food, any hygienic problem is excluded. Further, the strength of the container can be adjusted by varying the amount of the rosin, and therefore, its application field and its usefulness are very wide. Further, the color of the starch and the cereal powders are white, and therefore, the coloring of the container is easy. The ingredients of the mixture is simple, and therefore, the manufacture can be speedy. When discarding the container, it is naturally decomposed, thereby excluding any environmental contamination.

What is claimed is:

1. A method for manufacturing a container by using a starch or cereal powders, comprising the steps of:

mixing 80 wt % of corn starch and 20 wt % of water, and carrying out an agitation for 30 minutes at 60 rpm to form a mixture:

carrying out a heating on the mixture at a temperature of 100 degrees C. until the mixture forms a glue, so as to improve a sticking property;

drying the glue and powderizing the glue;

mixing 70 wt % of the corn starch (thus powderized) with 15 wt % of rosin, and carrying out an agitation;

further adding 15 wt % of water, and carrying out an agitation to form a paste; and putting the paste into a fabricator at a temperature of 250–350 degrees C., and pressing the paste with a pressure of 5 Kg/square cm, whereby the container is manufactured.

2. A method for manufacturing a container by using a starch or cereal powders, comprising the steps of:

mixing 80 wt % of potato starch and 20 wt % of water, and carrying out an agitation for 30 minutes at 60 rpm to form a mixture;

carrying out a heating on the mixture at a temperature of 100 degrees C. until the mixture forms a glue, so as to improve a sticking property;

drying the glue and powderizing the glue;

mixing 70 wt % of the potato starch (thus powderized) with 15 wt % of rosin, and carrying out an agitation;

further adding 15 wt % of water, and carrying out an agitation to form a paste; and putting the paste into a fabricator at a temperature of 250–350 degrees C., and pressing the paste with a pressure of 5 Kg/square cm, whereby the container is manufactured.

3. A method for manufacturing a container by using a starch or cereal powders, comprising the steps of:

mixing 80 wt % of wheat flour and 20 wt % of water, and carrying out an agitation for 30 minutes at 60 rpm to form a mixture;

carrying out a heating on the mixture at a temperature of 100 degrees C. until the mixture forms a glue, so as to improve a sticking property;

drying the glue and powderizing the glue;

mixing 70 wt % of the wheat flour (thus powderized) with 15 wt % of rosin, and carrying out an agitation;

further adding 15 wt % of water, and carrying out an agitation to form a paste; and putting the paste into a fabricator at a temperature of 250–350 degrees C., and pressing the paste with a pressure of 5 Kg/square cm, whereby the container is manufactured.

4. A method for manufacturing a container by using a starch or cereal powders, comprising the steps of:

mixing 80 wt % of rice flour and 20 wt % of water, and carrying out an agitation for 30 minutes at 60 rpm to form a mixture;

carrying out a heating on the mixture at a temperature of 100 degrees C. until the mixture forms a glue, so as to improve a sticking property;

drying the glue and powderizing the glue;

mixing 70 wt % of the rice flour (thus powderized) with 15 wt % of rosin, and carrying out an agitation;

further adding 15 wt % of water, and carrying out an agitation to form a paste; and putting the paste into a fabricator at a temperature of 250–350 degrees C., and pressing the paste with a pressure of 5 Kg/square cm, whereby the container is manufactured.

5. A method for manufacturing a container by using a starch or cereal powders, comprising the steps of:

mixing 80 wt % of barley flour and 20 wt % of water, and carrying out an agitation for 30 minutes at 60 rpm to form a mixture;

carrying out a heating on the mixture at a temperature of 100 degrees C. until the mixture forms a glue, so as to improve a sticking property;

drying the glue and powderizing the glue;

mixing 70 wt % of the barley flour (thus powderized) with 15 wt % of rosin, and carrying out an agitation;

further adding 15 wt % of water, and carrying out an agitation to form a paste; and putting the paste into a fabricator at a temperature of 250–350 degrees C., and pressing the paste with a pressure of 5 Kg/square cm, whereby the container is manufactured.

6. A method for manufacturing a container by using a starch or cereal powders, comprising the steps of:

mixing 70 wt % of a natural starch powder with 15 wt % of rosin, and carrying out an agitation for 30 minutes at 60 rpm;

further adding 15 wt % of water, and carrying out an agitation to form a paste; and putting the paste into a fabricator at a temperature of 250–350 degrees C., and pressing the paste with a pressure of 5 Kg/square cm, whereby the container is manufactured.

* * * * *